United States Patent [19]

Harvey

[11] Patent Number: 4,600,286
[45] Date of Patent: Jul. 15, 1986

[54] CAMERA WITH FILM TAKE-UP SPOOL
[75] Inventor: Donald M. Harvey, Webster, N.Y.
[73] Assignee: Eastman Kodak Company, Rochester, N.Y.
[21] Appl. No.: 701,719
[22] Filed: Feb. 14, 1985
[51] Int. Cl.$^4$ ................................................ G03B 1/00
[52] U.S. Cl. ...................................... 354/212; 242/71; 242/74
[58] Field of Search .............. 354/212, 213, 214, 215, 354/216; 352/187, 188, 189, 190; 242/71, 71.1, 71.2, 74, 195

[56] References Cited

U.S. PATENT DOCUMENTS

| 3,315,911 | 4/1967 | Bundschuh et al. | 242/74 |
| 3,484,053 | 12/1969 | Rehn et al. | 242/74 |
| 4,451,011 | 5/1984 | Engelsmann | 242/71 |

FOREIGN PATENT DOCUMENTS 48-44973 12/1973 Japan .

Primary Examiner—L. T. Hix
Assistant Examiner—Brian W. Brown
Attorney, Agent, or Firm—Roger A. Fields

[57] ABSTRACT

A camera is adapted to receive a filmstrip having a leader portion narrower than the remainder of the filmstrip. A rotary take-up spool in the camera includes a plurality of engaging members for engaging the leader to wind the filmstrip onto the spool. At least one of the engaging members is disposed at a location on the spool to engage a leader properly positioned in relation to the spool, to provide proper winding of the filmstrip onto the spool. The other engaging members are disposed at respective locations on the spool to engage the leader in various improper positions the leader may be located, which prevent proper winding of the filmstrip onto the spool. Each of the other engaging members is supported for movement in engagement with a leader in an improper position to situate the leader in the proper position. A cam, disposed proximate the spool to abut the wider remainder of a filmstrip with a leader engaged by one of the other engaging members, causes the engaged leader and member to move to situate the leader in the proper position, whereby the filmstrip can be properly wound onto the spool.

7 Claims, 5 Drawing Figures

CAMERA WITH FILM TAKE-UP SPOOL

BACKGROUND OF THE INVENTION

1. Field of the Invention

The invention generally relates to photographic cameras adapted to receive a filmstrip having a leader, wherein a rotary take-up spool includes a plurality of engaging members for engaging the leader to wind the filmstrip onto the spool. More particularly, the invention relates to apparatus for properly positioning the leader with respect to the spool in the event the leader is improperly positioned, initially. 2. Description of the Prior Art As is well known, 35mm film conventionally includes a row of perforations adjacent each of its longitudinal edges. The perforations are utilized, among other purposes, for film advance in a camera. Typically, the advance mechanism in the camera includes a sprocket wheel having a plurality of teeth which engage the filmstrip in its perforations to pull the filmstrip in increments across an exposure window. A film take-up spool is coupled to the sprocket wheel, often by a slipping clutch assembly to compensate for the varying thickness of the film roll on the spool as more of the exposed film is wound onto the spool. The filmstrip is provided in a light-tight cartridge which may be loaded in the camera in daylight. A leader portion of the filmstrip extends from the cartridge through a light-trapping opening and usually has a tongue-shaped configuration of a width which is approximately half the width of the remainder of the filmstrip. When the cartridge is loaded in the camera, the film leader is intially located with its single row of edge perforations in the operating region of several teeth circumferentially disposed in coplanar relation on the take-up spool. As the spool is rotated, one or more of the teeth engage the leader in its perforations to wind the leader onto the spool. A spring-like deflector may be provided, for example, on the back door of the camera for pressing the leader against the spool to ensure engagement of the leader by the teeth on the spool.

When the cartridge is loaded in the camera, the tongue-shaped leader may be inclined with respect to the axes of rotation of the take-up spool to such an extent that the row of perforations in the leader is situated outside the operating region of the teeth on the spool. Consequently, the leader cannot be secured to the spool. This problem is addressed in U.S. Pat. No. 4,451,011. According to the patent, the teeth on the take-up spool are offset from one another in an axial direction, as well as in a circumferential direction, to engage the leader in its perforations even in the event of inclined introduction of the leader into the camera. Such a proposed solution is not without its shortcomings, however. Although one or more of the teeth will engage the leader in an inclined position with respect to the axis of the spool, it appears that the leader may not be properly wound onto the spool because the leader will remain in the inclined position. As a result, the filmstrip will be wound on the spool in a helix and a film jam may result.

Another approach is disclosed in U.S. Pat. No. 3,484,053. In that patent, it is proposed that a tongue-shaped leader initially in an inclined position with respect to the axis of the take-up spool be displaced to a non-inclined position with respect to the axis before the leader can be engaged by the teeth on the spool. According to the patent, the take-up spool has a pair of coaxial portions of slightly different diameters. The teeth are circumferentially disposed in co-planar relation on the spool portion of smaller diameter. The spool portion of larger diameter terminates at its junction with the spool portion of smaller diameter in a sharp edge which extends around the axis of the take-up spool along a helix having a single convolution. During rotation of the take-up spool, the helical edge of the spool portion of larger diameter abuts a longitudinal edge of the leader as the leader is wound onto the spool portion of smaller diameter. Whenever the leader is in an inclined position, the helical edge displaces the leader until it is located in a non-inclined position, in the operating region of the teeth. Thus, the teeth can engage the leader in its perforations and the leader can be properly wound onto the spool portion of smaller diameter. The wider remainder of the filmstrip is wound onto the pair of spool portions after approximately two convolutions of the leader are wound on the spool portion of smaller diameter.

Although the approach disclosed in U.S. Pat. No. 3,484,053 might appear preferable to the one disclosed in U.S. Pat. No. 4,451,011, it too is not without its shortcomings. For example, a leader in an inclined position may overlap the helical edge of the spool portion of larger diameter, in which case the helical edge may not abut the longitudinal edge of the leader to displace the leader to the non-inclined position.

SUMMARY OF THE INVENTION

The above-described problems relating to inclined introduction of a film leader into a camera are believed solved by the invention.

According to the invention, there is provided in a camera of the type adapted to receive a filmstrip having a leader, wherein a rotary take-up spool has engaging means for engaging the leader to wind the filmstrip onto the spool, the improvement comprising:

said engaging means including a first engaging member disposed at a location on the take-up spool to engage a film leader properly positioned in relation to the spool, for proper winding of a filmstrip onto the spool, and a plurality of second engaging members disposed at respective locations on the spool to engage a film leader in various improper positions the leader may be located which prevent proper winding of a filmstrip onto the spool; and means supporting each of the second engaging members for movement in engagement with a film leader in an improper position to situate the leader in the proper position, whereby the filmstrip can be properly wound onto the take-up spool.

More particularly, there is provided in a camera of the type adapted to receive a filmstrip having a tongue-shaped leader narrower than the remainder of the filmstrip, wherein a rotary take-up spool has engaging means for engaging the leader to wind the filmstrip onto the spool, the improvement comprising:

said engaging means including a first engaging member disposed at a location on the take-up spool to engage a film leader properly positioned in non-inclined relation to the rotational axis of the spool, for proper winding of a filmstrip onto the spool, and a plurality of second engaging members circumferentially disposed at respective axially-spaced locations on the spool to engage a film leader in various inclined positions the leader may be located which prevent proper winding of a filmstrip onto the spool;

means supporting each of the second engaging members for axial movement in engagement with a film leader in an inclined position to situate the leader in the proper (non-inclined) position; and cam means, disposed proximate the take-up spool to abut the wider remainder of a filmstrip with a leader engaged by one of the second engaging members, for moving the engaged leader and second member axially to situate the leader in the proper position, whereby the filmstrip can be properly wound onto the spool.

In a preferred embodiment of the invention, the film leader is edge-perforated, and the second engaging members include respective teeth circumferentially disposed about the axis of the take-up spool along a helix having a single convolution for engaging the film leader in the various inclined positions in only one perforation. Moreover, the take-up spool is supported for movement along its axis in a direction to displace a film leader engaged by one of the teeth from an inclined position to the proper (non-inclined) position.

BRIFF DESCRIPTION OF THE DRAWINGS

The invention will be described in connection with the drawings, wherein.

DESCRIPTION OF THE PREFERRED EMBODIMENT

The invention is described as being embodied in a 35 mm still camera. Because such photographic cameras are well known, this description is directed in particular to camera elements forming part of or cooperating directly with the preferred embodiment. It is to be understood, however, that camera elements not specifically shown or described may take various forms known to persons of ordinary skill in the art.

Figure 1:
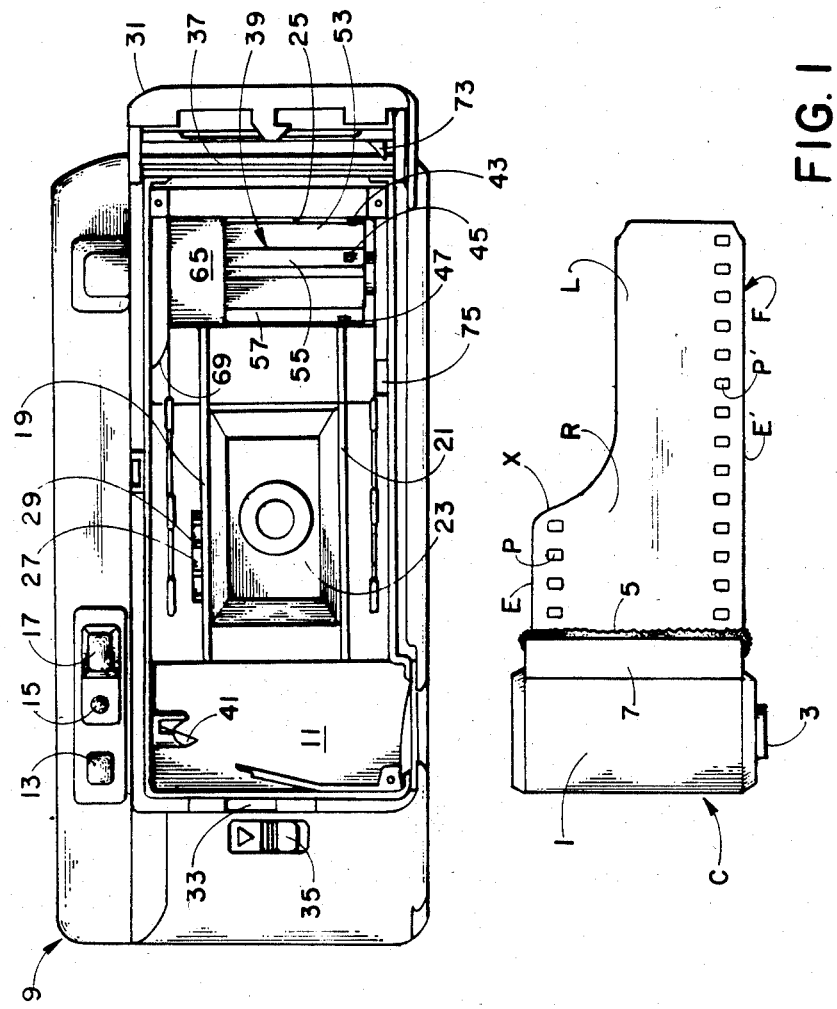
FIG. 1 is a rear elevation view of a camera with its back door opened to receive a film cartridge having a leader (narrower than the remainder of the from filmstrip) extending from the cartridge.

Referring now to the drawings and in particular to FIG. 1, a 35 mm still camera is shown in an opened state for receiving a known film cartridge C, such as one manufactured by Eastman Kodak Company. The cartridge C comprises a light-tight container 1 housing a rotatably supported spool 3 on which is wound an edge-perforated 35 mm filmstrip F. As viewed in FIG. 1, the filmstrip F has an upper row of perforations P adjacent a longitudinal edge E and a lower row of perforations P' adjacent a longitudinal edge E'. A leader portion L of the filmstrip F extends from the cartridge C, from a plush-lined light-trapping slit 5 in a throat 7 of the cartridge, and has a tongue-shaped configuration of a width which is approximately half of the width of the remainder R of the filmstrip.

The 35 mm camera includes a camera body 9 on which is provided a number of commonplace elements, such as a cartridge receiving chamber 11, a flash ready lamp 13 for a built-in electronic flash, not shown; a low light warning lamp 15; a viewfinder window 17; a pair of substantially parallel film rails 19 and 21; a film exposure window 23; a film take-up chamber 25; a film advance sprocket 27 having a plurality of teeth 29 for engaging the filmstrip in its perforations P to pull the filmstrip in successive longitudinal sections across the exposure window; a back door 31; a latch 33 for securing the back door closed; a manual operated release 35 for the latch; and a pressure plate 37 spring-supported on the inside of the back door for holding each successive section of the filmstrip flat on the two rails during film exposure at the exposure window. A rotary film take-up spool 39 is located in the take-up chamber 25 for taking up the filmstrip F. The take-up spool 39 is coupled to the advance sprocket 29 by a known gear and slipping clutch assembly, not shown, to rotate the take-up spool and to compensate for the varying thickness of the film roll as more of the exposed film is wound onto the take-up spool. A rotary rewind shaft 41 is located in the cartridge receiving chamber 11 for engaging the film spool 3 on the cartridge C to rewind the exposed film back into the cartridge through its slit 5, after exposure of the filmstrip F is complete.

Figure 2:
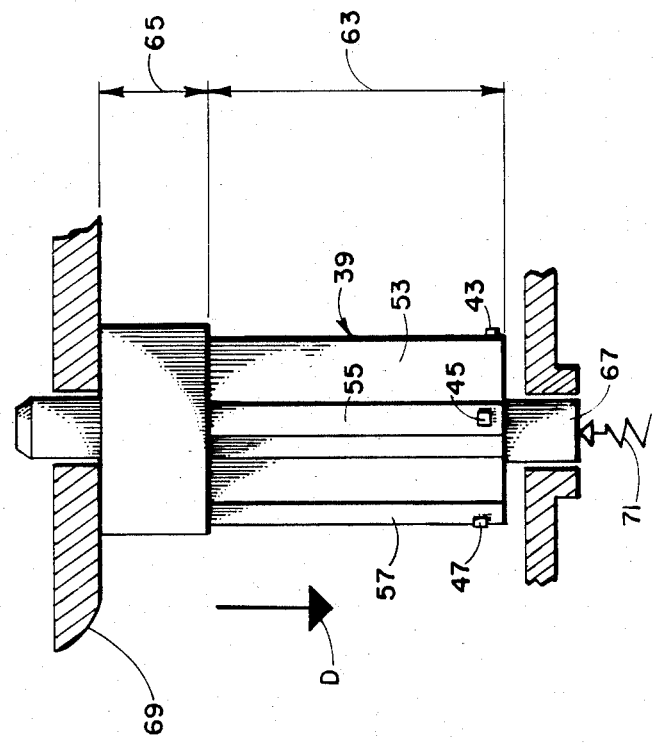
FIG. 2 is an elevation view of apparatus in the camera, according to a preferred embodiment of the invention, for properly positioning the film leader with respect to a take-up spool in the event the leader is improperly positioned, initially.
Figure 3:
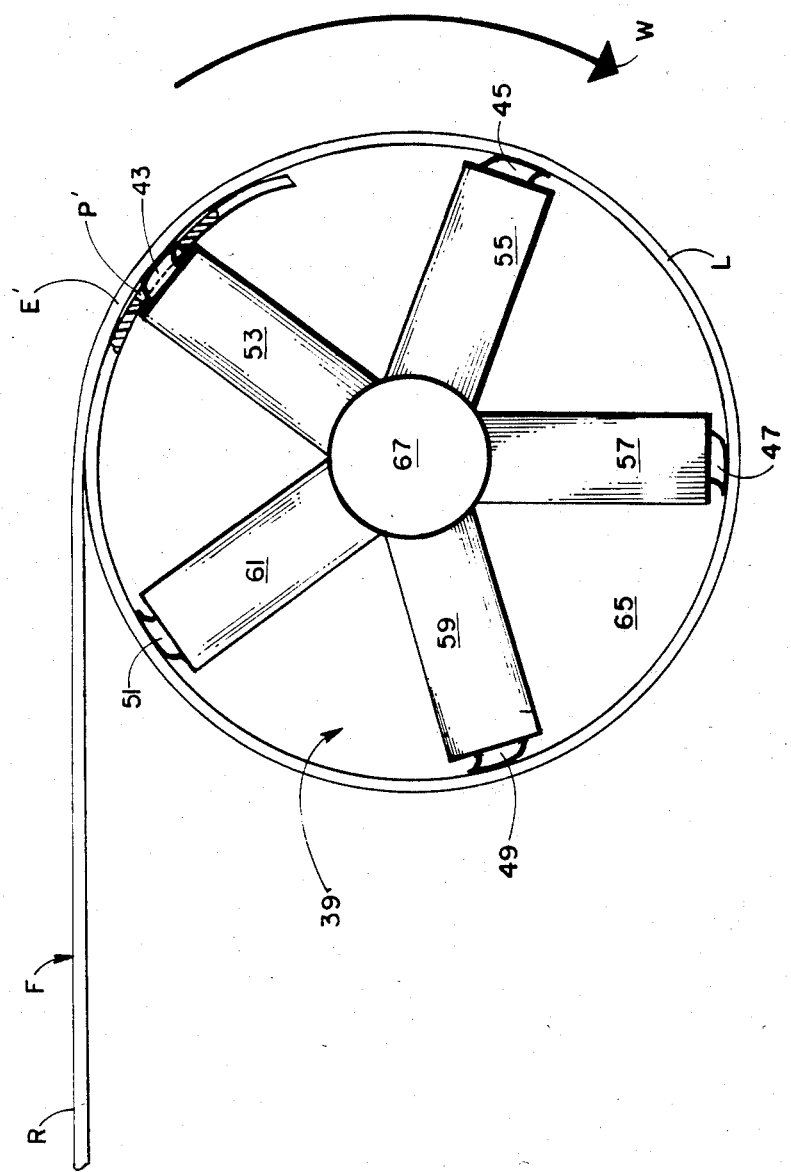
FIG. 3 is a bottom view of the take-up spool with the film leader wound onto it.

As shown in FIGS. 2 and 3, the take-up spool 39 includes five teeth 43, 45, 47, 49 and 51 projecting from respective spoke members 53, 55, 57, 59 and 61. The five spoke members 53 to 61 are evenly spaced from one another and radially extend from an axis of rotation of the spool 39. The five teeth 43 to 51 are circumferentially disposed about the axis of the spool 39 along a helix having a single convolution extending all of the way around the axis. In essence, the five teeth 43 to 51 are evenly spaced from one another axially, as well as circumferentially, on the spool 39.

Figure 5:
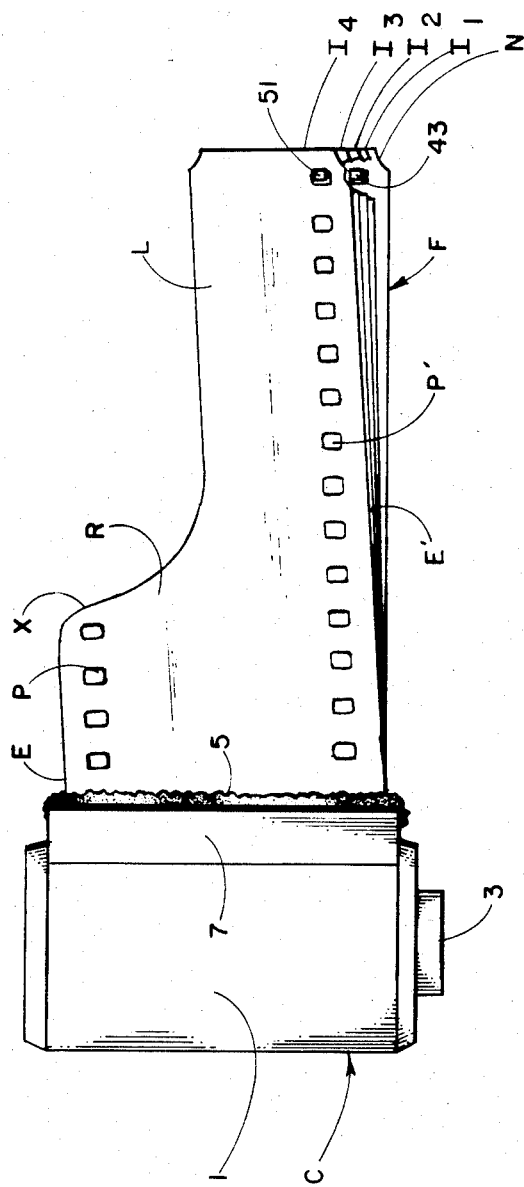
FIG. 5 is a schematic view of the cartridge with the leader in various improper positions for engagement by respective axially-spaced teeth on the take-up spool.

When the film cartridge C is loaded in the cartridge-receiving chamber 11, the cartridge is positioned with its throat 7 pointing towards the take-up spool 39. Optimally, the tongue-shaped leader L is initially located with its row of perforations P' in the operating region of the one tooth 43 on the spool 39. As viewed in FIG. 1, the tooth 43 is the lowermost tooth on the spool 39. The tooth 43 is disposed at a location on the spool 39 to engage the leader L in a non-inclined position N, as shown in FIG. 5, to ensure alignment of the row of perforations P on the wider remainder R of the filmstrip F with the advance sprocket 27. Moreover, the tooth 43 is disposed for engagement with the leader L to provide proper (non-helical) winding of the filmstrip F onto the spool 39. As the spool 39 is rotated in a clockwise direction W, as viewed in FIG. 3, the tooth 43 will engage the leader L in one of its perforations P' to wind the filmstrip F onto the spool. A known spring-like deflector, not shown, may be provided on the inside of the back door 31 to press the leader L against the spool 39 (when the door is closed) to facilitate engagement of the leader by the tooth 43.

The take-up spool 39 may be considered to comprise a pair of coaxial spool portions 63 and 65 of different diameters, as shown in FIG. 2. The spool position of smaller diameter 63 is defined by the five spoke members 53 to 61 and a center coreshaft 67. The five teeth 43 to 51 project from the respective spoke members 53 to 61 a radial distance which is slightly greater than the thickness of the filmstrip F. This distance, together with one-half of the diameter of the spool portion of smaller diameter 63, is less than one-half of the diameter of the other spool portion 65 by approximately the thickness of the filmstrip F. That is to say, the radial distance between the leader-engaging tip of any one of the five teeth 43 to 51 and the axis of the spool 39 is less than the radial distance between the exterior surface of the spool portion of larger diameter 65 and the axis by approximately the thickness of the filmstrip F. With such a construction, after the tongue-shaped leader L is engaged by any one of the five teeth 43 to 51 and is wound over the one tooth, as shown for the tooth 43 in FIG. 3, the exterior surface of the outermost convolution of the wound leader will have a diameter approximately the same as the spool portion of larger diameter 65, thereby forming a cylindrical extension of the exterior surface of the spool portion of larger diameter. Consequently, the wider remainder R of the filmstrip F can then be reliably wound onto the spool portion of larger diameter 63 and the wound leader L.

Figure 4:
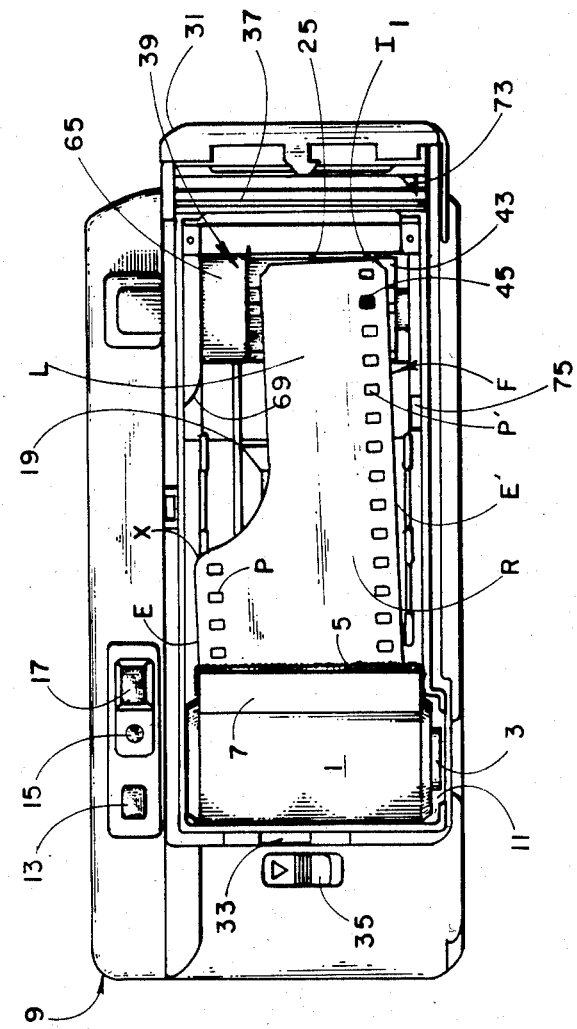
FIG. 4 is a rear elevation view of the camera depicted in FIG. 1, showing the cartridge in the camera and the leader improperly positioned with respect to the take-up spool.

When the film cartridge C is loaded in the cartridge-receiving chamber 11, the tongue-shaped leader L may be initially located in any one of several inclined positions $I_1$, $I_2$, $I_3$, and $I_4$, shown in FIG. 5, which prevent alignment of the row of perforations P in the wider remainder R of the filmstrip F with the advance sprocket 27 and prevent proper (non-helical) winding of the filmstrip F onto the take-up spool 39. In this instance, the leader L is not located with its row of perforations P' in the operating region of the lowermost tooth 43, but rather is located with the row of perforations in the operating region of one of the other teeth 45, 47, 49, or 51. For example, in FIG. 4, the leader L is shown in the inclined position $I_1$, engaged by the tooth 45. The four teeth 45 to 51 are disposed at respective axially-spaced locations on the spool 39 to engage the leader L in the various inclined, i.e., improper, positions $I_1$–$I_4$ the leader may be initially located. As shown in FIG. 2, the spool 39 is supported at its center core-shaft 67 for movement along its axis in a direction D to displace the leader L, in engagement with one of the four teeth 45 to 51, from any one of the inclined (improper) positions $I_1$–$I_4$ to the non-inclined (proper) position N. See FIG. 5. An arcuate-shaped cam surface 69 is disposed proximate the spool 39 to abut a curved edge portion X of the longitudinal edge E of the filmstrip F, which extends between the leader L and the wider remainder R of the filmstrip, whenever, as shown in FIG. 4, the leader is engaged by one of the four teeth 45 to 51. The cam surface 69 causes the engaged leader and the spool 39 to shift in the axial direction D, against the contrary urging of a return spring 71, schematically shown in FIG. 2, to situate the engaged leader in the non-inclined (proper) position N, whereby the filmstrip can be properly wound onto the spool.

A wedge 73 is disposed on the inside of the back door 31 to abut the longitudinal edge E' of the leader L to move the leader widthwise until its row of perforations P' is located in the operating region of the lowermost tooth 43 on the take-up spool 39, in the event the leader is initially inclined below the non-inclined position N, shown in FIG. 5. The wedge 73 operates to move the leader L as the door 31 is closed, and is received in an opening 75 in the camera body 9.

Thus, with the preferred embodiment of the invention, there is provided apparatus for properly positioning a leader portion of a filmstrip with respect to a take-up spool, to ensure proper winding of the filmstrip onto the spool, in the event the leader is improperly positioned, initially.

While the invention has been described with reference to a preferred embodiment, it will be understood that various modifications may be effected within the ordinary skill in the art without departing from the scope of the invention. For example, the spool portion of smaller diameter 63 may be movable relative to the spool portion of larger diameter 65 in the axial direction D, rather than the entire take-up spool 39 being movable in such direction. Alternatively, the five teeth 43 to 51 on the take-up spool 39 may be separately supported for individual movement with respect to the spool in the axial direction D.

I claim:

1. In a camera of the type adapted to receive a filmstrip having a leader, and wherein a rotary take-up spool has engaging means for engaging the leader to wind the filmstrip onto said spool, the improvement comprising:

said engaging means including a first engaging member disposed at a location on said take-up spool to engage a film leader properly positioned in relation to the spool, for proper winding of a filmstrip onto said spool, and a plurality of second engaging members disposed at respective locations on said spool to engage a film leader in various improper positions the leader may be located which prevent proper winding of a filmstrip onto the spool; and means supporting each of said second engaging members for movement in engagement with a film leader in an improper position to situate the leader in the proper position, whereby the filmstrip can be properly wound onto said take-up spool.

2. In a camera of the type adapted to receive a filmstrip having a leader narrower than the remainder of the filmstrip, and wherein a rotary take-up spool has engaging means for engaging the leader to wind the filmstrip onto said spool, the improvement comprising:

said engaging means including a first engaging member disposed at a location on said take-up spool to engage a film leader properly positioned in relation to the spool, for proper winding of a filmstrip onto said spool, and a plurality of second engaging members disposed at respective locations on said spool to engage a film leader in various improper positions the leader may be located which prevent proper winding of a film-strip onto the spool;

means supporting each of said second engaging members for movement in engagement with a film leader in an improper position to situate the leader in the proper position; and cam means, disposed proximate said take-up spool to abut the wider remainder of a filmstrip with a leader engaged by one of said second engaging members, for moving the engaged leader and second member to situate the leader in the proper position, whereby the filmstrip can be properly wound onto the spool.

3. The improvement as recited in claim 2, wherein the film leader is edge-perforated, and wherein said second engaging members include respective teeth circumferentially disposed on said take-up spool along a helix for engaging the film leader in its various improper positions in only one perforation.

4. In a camera adapted to receive a filmstrip having a leader, and wherein a rotary take-up spool has engaging means for engaging the leader to wind the filmstrip onto said spool, the improvement comprising:

said engaging means including a first engaging member disposed at a location on said take-up spool to engage a film leader properly positioned in non-inclined relation to an axis of rotation of the spool, for proper winding of a filmstrip onto said spool, and a plurality of second engaging members disposed at respective axially-spaced locations on the spool to engage a film leader in various inclined positions in relation to the axis which prevent proper winding of a filmstrip onto said spool; and means supporting each of said second engaging members for movement substantially parallel to said axis of the spool to situate a film leader engaged by one of the second members in the proper position, whereby the filmstrip can be properly wound onto said spool.

5. In a camera of the type adapted to receive a filmstrip having a leader narrower than the remainder of the filmstrip, and wherein a rotary take-up spool has engaging means for engaging the leader to wind the filmstrip onto said spool, the improvement comprising:

said engaging means including a first engaging member disposed at a location on said take-up spool to engage a film leader properly positioned in non-inclined relation to an axis of rotation of the spool, for proper winding of a filmstrip onto said spool, and a plurality of second engaging members disposed at respective axially-spaced locations on the spool to engage a film leader in various inclined positions in relation to the axis which prevent proper winding of a filmstrip onto said spool;

means supporting said take-up spool for movement along its axis to situate a film leader engaged by one of said second engaging members in the proper position; and cam means, disposed proximate said take-up spool to abut the wider remainder of a filmstrip with a leader engaged by one of said second engaging members, for moving the spool to situate the engaged leader in the proper position, whereby the filmstrip can be properly wound onto the spool.

6. The improvement as recited in claim 5, wherein the film leader is edge-perforated, and wherein said second engaging members include respective teeth circumferentially disposed about said axis of the take-up spool along a helix having a single convolution for engaging the film leader in its various inclined positions in only one perforation.

7. The improvement as recited in claim 6, wherein said take-up spool includes a pair of coaxial portions having different diameters, and wherein said teeth project from the spool portion of smaller diameter a distance which together with one-half of the smaller diameter is less than one-half of the larger diameter of the other spool portion by approximately the thickness of the filmstrip.

* * * * *